(12) United States Patent
Zhang et al.

(10) Patent No.: US 12,117,167 B2
(45) Date of Patent: Oct. 15, 2024

(54) METHODS AND SYSTEMS FOR DENITROGENATION COMBUSTION AND $CO_2$ CAPTURE AND UTILIZATION IN GAS BOILERS

(71) Applicant: SHANGHAI YUANHAN ENERGY & CHEMICAL TECHNOLOGY CO., LTD., Shanghai (CN)

(72) Inventors: Xiangquan Zhang, Shanghai (CN); Wenjun Wu, Shanghai (CN); Yunfeng Zhang, Shanghai (CN)

(73) Assignee: SHANGHAI YUANHAN ENERGY & CHEMICAL TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/664,370

(22) Filed: May 15, 2024

(65) Prior Publication Data
US 2024/0302037 A1 Sep. 12, 2024

Related U.S. Application Data (63) Continuation-in-part of application No. PCT/CN2022/086382, filed on Apr. 12, 2022.

(30) Foreign Application Priority Data

Dec. 3, 2021 (CN) .......................... 202111466784.3

(51) Int. Cl.
*F23C 9/00* (2006.01)
*B01D 53/26* (2006.01)
(Continued)

(52) U.S. Cl.
CPC ................ *F23C 9/00* (2013.01); *B01D 53/26* (2013.01); *B01F 23/10* (2022.01);
(Continued)

(58) Field of Classification Search
CPC ................ F23C 9/00; F23C 2900/9901; F23C 2202/30; F23L 7/007
See application file for complete search history.

(56) References Cited

U.S. PATENT DOCUMENTS 9,216,903 B2 * 12/2015 McKenna ............... C01B 32/50
11,407,645 B2 * 8/2022 Alekseev ............... C01B 32/50
(Continued)

FOREIGN PATENT DOCUMENTS

CN 102431974 A 5/2012
CN 105627349 A 6/2016
(Continued)

OTHER PUBLICATIONS

First Office Action in Chinese Application No. 202111466784.3 mailed on Dec. 14, 2023, 14 pages.
(Continued)

*Primary Examiner* — Jorge A Pereiro
(74) *Attorney, Agent, or Firm* — PORUS IP LLC (57) ABSTRACT

The present disclosure provides a method and a system for denitrogenation combustion and $CO_2$ capture and utilization in a gas boiler. The method is implemented by the system for denitrogenation combustion and $CO_2$ capture and utilization in the gas boiler, and comprises: after circulating flue gas is discharged from a gas boiler, introducing the circulating flue gas into a gas heat exchanger to perform heat exchange with natural gas, hydrogen, and carbon-based denitrogenation gas; introducing the circulating flue gas after heat exchange into a flue gas dehydration device to perform dehydration; introducing a first portion of the circulating flue gas after the heat exchange and dehydration into a blower through the flue gas dehydration device to be pressurized by the blower and introduced into a carbon-based denitrogenation gas mixer; preparing the carbon-based denitrogenation gas by mixing oxygen and the circulating flue gas using the carbon- (Continued)

based denitrogenation gas mixer for combustion for the gas boiler; and introducing a second portion of the circulating flue gas after heat exchange and dehydration into a $CO_2$ recovery device to perform purification and deoxygenation through the flue gas dehydration device to obtain a $CO_2$ product, and pressurizing and transmitting the $CO_2$ product to a $CO_2$ utilization device through a $CO_2$ compressor.

10 Claims, 4 Drawing Sheets

(51) Int. Cl.
    *B01F 23/10*     (2022.01)
    *B01F 25/431*     (2022.01)
    *B01F 25/452*     (2022.01)
    *F23L 7/00*     (2006.01)
    *F23L 15/04*     (2006.01)

(52) U.S. Cl.
    CPC ...... *B01F 25/4317* (2022.01); *B01F 25/4523* (2022.01); *F23L 7/007* (2013.01); *F23L 15/04* (2013.01); *B01D 2257/80* (2013.01); *B01D 2258/0283* (2013.01); *F23C 2202/30* (2013.01); *F23C 2900/9901* (2013.01)

(56) References Cited

U.S. PATENT DOCUMENTS

| | | | | |
|---|---|---|---|---|
| 2003/0097840 | A1* | 5/2003 | Hsu | F23J 15/006 60/676 |
| 2011/0041740 | A1* | 2/2011 | Reilly | F23C 9/00 110/341 |
| 2013/0133337 | A1* | 5/2013 | ELKady | F23L 7/007 431/2 |
| 2017/0089574 | A1* | 3/2017 | Stinessen | F23L 7/007 |
| 2021/0340075 | A1* | 11/2021 | Schuetzle | B01J 23/755 |
| 2022/0003406 | A1* | 1/2022 | Ruiz | F23C 9/00 |
| 2023/0034842 | A1 | 2/2023 | Wei et al. | |

FOREIGN PATENT DOCUMENTS

| | | |
|---|---|---|
| CN | 205402669 U | 7/2016 |
| CN | 106498432 A | 3/2017 |
| CN | 107543422 A | 1/2018 |
| CN | 206846696 U | 1/2018 |
| CN | 107860238 A | 3/2018 |
| CN | 107940432 A | 4/2018 |
| CN | 111623332 A | 9/2020 |
| CN | 112413571 A | 2/2021 |
| CN | 113405279 A | 9/2021 |
| CN | 113416131 A | 9/2021 |
| CN | 214370934 U | 10/2021 |
| CN | 114110574 A | 3/2022 |
| CN | 216303280 U | 4/2022 |
| CN | 115505406 A | 12/2022 |
| DE | 102012025722 B3 | 8/2018 |
| EP | 2100869 A1 | 9/2009 |
| JP | 2015209567 A | 11/2015 |
| WO | 2014207035 A1 | 12/2014 |
| WO | WO-2022079408 A1 * | 4/2022 ......... B01D 53/1475 |

OTHER PUBLICATIONS

Decision to Grant a Patent in Chinese Application No. 202111466784.3 mailed on Mar. 7, 2024, 4 pages.

International Search Report in PCT/CN2022/086382 mailed on Jul. 20, 2022, 7 pages.

Written Opinion in PCT/CN2022/086382 mailed on Jul. 20, 2022, 8 pages.

* cited by examiner

METHODS AND SYSTEMS FOR DENITROGENATION COMBUSTION AND CO$_2$ CAPTURE AND UTILIZATION IN GAS BOILERS

CROSS-REFERENCE TO RELATED APPLICATIONS

This application is a continuation-in-part of an International Application No. PCT/CN2022/086382 filed on Apr. 12, 2022, which claims priority of Chinese Patent Application No. CN202111466784.3 filed on Dec. 3, 2021, the entire contents of which are incorporated herein by reference.

TECHNICAL FIELD

The present disclosure relates to the field of combustion technology, and in particular to a method and a system for denitrogenation combustion and CO$_2$ capture and utilization in a gas boiler.

BACKGROUND

Greenhouse gas (GHG) emissions are the most important factor causing global warming, with CO$_2$ accounting for over 70% of the greenhouse effect caused by all GHGs. Therefore, reducing CO$_2$ emissions is an urgent problem that is crucial for controlling the greenhouse effect and slowing down global warming.

At present, gas boilers mostly utilize air combustion, where only 21% of oxygen in the air is involved in combustion and 78% of nitrogen is not involved in the combustion process. However, a large amount of nitrogen in the air is heated and then discharged into the atmosphere, resulting in significant heat loss and excessive fuel consumption. In addition, nitrogen also reacts with oxygen at high temperatures to generate NOx, which is easily discharged into the atmosphere to form acid rain and cause environmental pollution.

SUMMARY

In response to the above problem, the objective of the present disclosure is to provide a method and a system for denitrogenation combustion and CO$_2$ capture and utilization in a gas boiler. The circulating flue gas generated by the gas boiler is treated, the treated circulating flue gas and the oxygen are prepared into carbon-based denitrogenation gas with a required oxygen concentration for the gas boiler for supporting combustion gas for the gas boiler, and CO$_2$ is recovered from the circulating flue gas, so that ultra-low emissions of nitrogen oxides and full recovery of CO$_2$ are realized, flue gas emissions are reduced, and the intensity of radiation in the gas boiler is greatly enhanced, thereby realizing significant effect of energy conservation and consumption reduction.

One or more embodiments of the present disclosure provide a system for denitrogenation combustion and CO$_2$ capture and utilization in a gas boiler. The system may comprise a natural gas supply device configured to supply natural gas; a hydrogen production device by water electrolysis configured to prepare hydrogen and oxygen; an oxygen preparation device configured to prepare oxygen and nitrogen; a nitrogen compressor configured to pressurize and transmit the nitrogen prepared by the oxygen preparation device to a nitrogen utilization device; a carbon-based denitrogenation gas mixer configured to prepare carbon-based denitrogenation gas by mixing the oxygen prepared by the hydrogen production device by water electrolysis, the oxygen prepared by the oxygen preparation device, and circulating flue gas transmitted by a blower; wherein the carbon-based denitrogenation gas mixer may include an outer cylinder, one end of the outer cylinder may be provided with an oxygen inlet pipe and a circulating flue gas inlet pipe, and the other end of the outer cylinder may be provided with a carbon-based denitrogenation gas outlet pipe; a gas distributor may be disposed at an end of the outer cylinder close to the oxygen inlet pipe and the circulating flue gas inlet pipe, the gas distributor may be a circular plate, and the circular plate may be uniformly provided with a preset count of first small holes; a gas collector may be disposed at an end of the outer cylinder close to the carbon-based denitrogenation gas outlet pipe, the gas collector may be a hollow frustum cone shape, a large round end of the hollow frustum cone shape may be provided with a circular plate, the large round end may be uniformly provided with a preset count of second small holes, and a small round end of the hollow frustum cone shape may be open and communicated with the carbon-based denitrogenation gas outlet pipe; a preset count of horizontal fins and vertical fins may be spaced between the gas distributor and the gas collector within the outer cylinder; and a work process of the carbon-based denitrogenation gas mixer may include: the oxygen prepared by the hydrogen production device by water electrolysis and the oxygen prepared by the oxygen preparation device entering the outer cylinder through the oxygen inlet pipe, and the circulating flue gas transmitted by the blower entering the outer cylinder through the circulating flue gas inlet pipe; the oxygen and the circulating flue gas being preliminarily mixed into a gas mixture before entering the gas distributor; the gas mixture passing through the first small holes uniformly distributed on the gas distributor, and then passing through the horizontal fins and the vertical fins for secondary mixing to obtain the carbon-based denitrogenation gas; and the carbon-based denitrogenation gas passing through the second small holes uniformly distributed on the gas collector to be collected into the carbon-based denitrogenation gas outlet pipe and discharged from the carbon-based denitrogenation gas mixer; a gas heat exchanger configured to perform heat exchange between the natural gas supplied by the natural gas supply device, the hydrogen prepared by the hydrogen production device by water electrolysis, the carbon-based denitrogenation gas supplied by the carbon-based denitrogenation gas mixer, and the circulating flue gas discharged from the gas boiler to heat the natural gas, the hydrogen, and the carbon-based denitrogenation gas using waste heat of the circulating flue gas discharged from the gas boiler; the gas boiler configured to burn the natural gas and the hydrogen prepared by the hydrogen production device by water electrolysis to generate heat, the gas boiler including a circulating flue gas outlet; a chimney configured to vent the circulating flue gas in the gas boiler under an abnormal operating condition or when an amount of the circulating flue gas is excessive; a flue gas dehydration device configured to dehydrate the circulating flue gas after heat exchange; the blower configured to pressurize and transmit a first portion of the circulating flue gas after heat exchange and dehydration to the carbon-based denitrogenation gas mixer; a CO$_2$ recovery device configured to purify and deoxidize a second portion of the circulating flue gas after heat exchange and dehydration to prepare a CO$_2$ product; a CO$_2$ compressor configured to pressurize and transmit the CO$_2$ product prepared by the CO₂ recovery device to a CO₂ utilization device; wherein the circulating flue gas outlet may be connected with the gas heat exchanger, the gas heat exchanger may be connected with the chimney and the flue gas dehydration device, respectively, and the flue gas dehydration device may be connected with the blower and the CO₂ recovery device, respectively; the blower may be connected with the carbon-based denitrogenation gas mixer, and a first flow regulating valve may be disposed on a connection pipeline between the blower and the carbon-based denitrogenation gas mixer; an oxygen outlet of the hydrogen production device by water electrolysis and an oxygen outlet of the oxygen preparation device are connected with the carbon-based denitrogenation gas mixer, and a second flow regulating valve may be disposed on a connection pipeline between the oxygen outlet of the hydrogen production device by water electrolysis and the oxygen outlet of the oxygen preparation device and the carbon-based denitrogenation gas mixer; the carbon-based denitrogenation gas mixer may be connected with the gas heat exchanger, a flow detector, a temperature detector, a pressure detector, an oxygen purity detector, and a third flow regulating valve may be disposed on a connection pipeline between the carbon-based denitrogenation gas mixer and the gas heat exchanger, and a carbon-based denitrogenation gas outlet of the gas heat exchanger may be connected with the gas boiler; a hydrogen outlet of the hydrogen production device by water electrolysis and a natural gas outlet of the natural gas supply device may be connected with the gas heat exchanger, and a hydrogen and natural gas outlet of the gas heat exchanger may be connected with the gas boiler; a CO₂ outlet of the CO₂ recovery device may be connected with the CO₂ compressor, the CO₂ compressor may be connected with the CO₂ utilization device, and a water outlet of the flue gas dehydration device may be connected with the oxygen preparation device; a nitrogen outlet of the oxygen preparation device may be connected with the nitrogen compressor, the nitrogen compressor may be connected with the nitrogen utilization device, and the nitrogen outlet of the oxygen preparation device may be further connected with an inlet of the blower to supply nitrogen to the blower for purging and replacement of front and rear pipelines of the blower; and the hydrogen production device by water electrolysis and the oxygen preparation device may be connected with a green power device, and the green power device may be disposed outside the system; and an air combustion fan configured to supplement chimney air in case of insufficient circulating flue gas or switch to air combustion without disturbance in case of an abnormal condition of carbon-based denitrogenation gas combustion, to ensure normal oxygenation and combustion of the gas boiler, the air combustion fan being connected with the gas heat exchanger.

One or more embodiments of the present disclosure provide a method for denitrogenation combustion and CO₂ capture and utilization in a gas boiler. The method may comprise: in an initial phase, the gas boiler utilizing air for supporting combustion to produce circulating flue gas; after the circulating flue gas is introduced into a gas heat exchanger from the gas boiler: when carbon-based denitrogenation gas is not introduced into the gas heat exchanger, performing heat exchange between the circulating flue gas and natural gas and hydrogen prepared by a hydrogen production device by water electrolysis to recover waste heat of the circulating flue gas; when the carbon-based denitrogenation gas is introduced into the gas heat exchanger, performing heat exchange between the circulating flue gas and the natural gas, the hydrogen prepared by the hydrogen production device by water electrolysis, and carbon-based denitrogenation gas prepared by a carbon-based denitrogenation gas mixer to recover the waste heat of the circulating flue gas; wherein the carbon-based denitrogenation gas may raise a temperature by 30° C.-50° C. through heat exchange to enter the gas boiler for supporting combustion, gradually replacing the air for supporting combustion until carbon-based denitrogenation gas combustion enters into a normal operation state; the natural gas and the hydrogen may raise a temperature by 30° C.-50° C. through heat exchange to enter the gas boiler to be used as the combustion gas; and a purity of the hydrogen prepared by the hydrogen production device by water electrolysis may be 99.9v % or more; introducing the circulating flue gas after heat exchange into a flue gas dehydration device for dehydration through a circulating flue gas outlet of the gas heat exchanger, wherein a CO₂ concentration of the circulating flue gas after heat exchange, dehydration, and circulating enrichment may be 95v % or more; introducing a first portion of the circulating flue gas after heat exchange and dehydration into a blower through the flue gas dehydration device, pressurizing by the blower and introducing into the carbon-based denitrogenation gas mixer; introducing oxygen prepared by an oxygen preparation device and the hydrogen production device by water electrolysis into the carbon-based denitrogenation gas mixer through an oxygen outlet of the oxygen preparation device and an oxygen outlet of the hydrogen production device by water electrolysis, respectively, obtaining the carbon-based denitrogenation gas by mixing the circulating flue gas after heat exchange, dehydration, and pressurization and the oxygen through the carbon-based denitrogenation gas mixer, and introducing the carbon-based denitrogenation gas into the gas heat exchanger for heat exchange before introducing into the gas boiler; wherein a purity of the oxygen prepared by the oxygen preparation device may be 99.6v % or more, and a pressure of the oxygen prepared by the oxygen preparation device may be within a range of 0.05-0.2 MPa without free water; a purity of the oxygen prepared by the hydrogen production device by water electrolysis may be 99.2v % or more without free water; an oxygen concentration of the carbon-based denitrogenation gas may be within a range of 18-35v %, and a pressure of the carbon-based denitrogenation gas may be within a range of 0.05-0.2 MPa; introducing a second portion of the circulating flue gas after heat exchange and dehydration into a CO₂ recovery device for purification and deoxygenation through the flue gas dehydration device to obtain a CO₂ product, and pressurizing and transmitting the CO₂ product to a CO₂ utilization device through a CO₂ compressor; and introducing the nitrogen prepared by the oxygen preparation device into a nitrogen compressor through the oxygen preparation device, and pressurizing and transmitting the nitrogen to a nitrogen utilization device through the nitrogen compressor, wherein a purity of the nitrogen prepared by the oxygen preparation device may be 99.9 v % or more.

Beneficial effects of the embodiments of the present disclosure include but are not limited to the following content.

(1) the CO₂-rich (95v % or more, without moisture) circulating flue gas and the oxygen prepared by the oxygen preparation device, and the oxygen prepared by the hydrogen production device by water electrolysis are prepared into the carbon-based denitrogenation gas with the suitable oxygen concentration required for the gas boiler to be used for supporting combustion for the gas boiler; meanwhile, the natural gas and the hydrogen prepared by the hydrogen production device by water electrolysis are used as the combustion gas; the nitrogen in the high temperature region of gas boiler combustion is replaced by $CO_2$, which avoids the generation of thermal nitrogen oxides in the combustion process, achieves ultra-low emissions of nitrogen oxides, and significantly enhances the intensity of radiation in the gas boiler, thereby realizing a significant effect of energy conservation and consumption reduction; at the same time, the oxygen content in the carbon-based denitrogenation gas entering the gas boiler can be adjusted based on changes in raw materials and furnace temperature, effectively enhancing the combustion effect, and making the reaction more complete, thereby increasing output and reducing energy consumption. In addition, since the $CO_2$ concentration in the circulating flue gas is increased (95v % or more, without moisture), $CO_2$ capture is easier, creating favorable conditions for low-cost carbon capture, utilization, and storage (CCUS). The captured $CO_2$ can be applied to the fields of oilfield mining and sequestration, steel slag mineralization, concrete mineralization, red mud curing, chemical industry (mainly including the production of methanol, urea, carbonate, carbon monoxide, and other products), and food storage and preservation through $CO_2$, which realizes full recovery of $CO_2$, and reduces $CO_2$ emissions, thereby reducing the greenhouse effect. The embodiments of the present disclosure have excellent performance in increasing production, energy conservation, and emission reduction, and can reduce the unit consumption of natural gas per ton of steam by more than 10%, increase production by more than 10%, and reduce flue gas emissions, thereby realizing ultra-low emissions of NOx.

(2) The embodiments of the present disclosure utilize the green power produced by renewable energy to power the hydrogen production device by water electrolysis to produce oxygen and hydrogen through the water electrolysis process for assisting combustion and burning in the gas boiler; and also utilize the green power produced by renewable energy to power the oxygen preparation device to produce oxygen and nitrogen through a deep cooling method, thereby further reducing carbon emissions, reducing the greenhouse effect, and realizing an effect of near-zero carbon emissions.

(3) The embodiments of the present disclosure utilize the hydrogen prepared by the hydrogen production device by water electrolysis and the natural gas as the combustion gas. The hydrogen is used for combustion in the gas boiler, increasing the water produced during the combustion process, which is then condensed and recycled, thereby saving water resources.

(4) According to the carbon-based denitrogenation gas mixer provided in the embodiments of the present disclosure, the gas distributor is disposed at the end of the outer cylinder, and the gas collector is disposed at the other end of the outer cylinder. The preset count of horizontal fins and vertical fins are spaced between the gas distributor and the gas collector. The oxygen and the circulating flue gas enter the outer cylinder through respective inlet pipes and are preliminarily mixed before entering the gas distributor. After being preliminarily mixed before entering the gas distribution, the oxygen and the circulating flue gas pass through the first small holes uniformly distributed on the gas distributor, then pass through the uniformly distributed horizontal fins and vertical fins for thorough mixing, and finally pass through the second small holes uniformly distributed on the gas collector to be collected before entering the carbon-based denitrogenation gas outlet pipe. The oxygen and the circulating flue gas are mixed in two operations. The oxygen and the circulating flue gas are preliminarily mixed before entering the gas distributor, then the preliminarily mixed oxygen and circulating flue gas continuously change flow direction within the spaced two types of fins, ensuring full and uniform mixing of the oxygen and the circulating flue gas, thereby enhancing the mixing effect. The first small holes uniformly distributed on the gas distributor enable uniform entry of the preliminarily mixed oxygen and circulating flue gas, preventing drift in the flow, and facilitating uniform mixing in the second operation. The gas collector is the frustum cone shape, conducive to collection of the uniformly mixed gas. In addition, the gas collector provides support for the horizontal fins and the vertical fins, preventing the horizontal fins and the vertical fins from entering the carbon-based denitrogenation gas outlet pipe.

(5) The embodiments of the present disclosure utilize waste heat of the circulating flue gas to perform heat exchange with the combustion gas (the hydrogen and natural gas) and combustion supporting gas (the carbon-based denitrogenation gas), thereby increasing the temperature of the combustion gas and the combustion supporting gas by 30° C. to 50° C., improving the combustion efficiency, and reducing fuel consumption.

(6) In the embodiments of the present disclosure, the $CO_2$ concentration of the circulating flue gas after circulating enrichment is 95v % or more. The circulating flue gas is subjected to heat exchange of the gas heat exchanger and dehydration of the flue gas dehydration device. The circulating flue gas after cooling and dehydration reduces the dew point corrosion of $CO_2$ on the pipelines, the blower, and other devices. Meanwhile, when the carbon-based denitrogenation gas is prepared, oxygen without moisture is introduced into the circulating flue gas, reducing the dew point of the circulating flue gas, and further decreasing the dew point corrosion of $CO_2$ on the pipelines, the blower, and other devices.

(7) Optimization the combustion environment makes the temperature distribution inside the gas boiler more reasonable, effectively extending the service life of the gas boiler.

(8) The denitrogenation combustion technology of the embodiments of the present disclosure not only increases the flame blackness, accelerates the combustion speed, and raises the flame temperature, but also ensures complete combustion of the unburned materials carried in the flue gas, thereby reducing blackness of the flue gas; and the combustion decomposition and formation of combustible harmful gases are fully burned, reducing harmful gases. The temperature and volume of the flue gas are significantly reduced, thereby reducing thermal pollution.

(9) The implementation of the denitrogenation combustion technology in the embodiments of the present disclosure does not need to change the structure of the gas boiler, and only needs partial optimization and modification of the combustion supporting system, the combustion system, and the circulating flue gas system. Meanwhile, the original air combustion fan is retained. In the event of abnormal conditions in the oxygen preparation device or the hydrogen production device by water electrolysis, the air combustion can be switched on without any disturbance to ensure normal supply of oxygen and combustion of the gas boiler.

(10) The by-product nitrogen from the oxygen preparation device of the embodiments of the present disclosure may be used in downstream devices, such as oilfield auxiliary oil recovery, lithium production, and the chemical industry (mainly including the production of liquid ammonia, liquefaction into liquid nitrogen, replacement gases, or protective gases, etc.); and may also be used to provide nitrogen for replacement and purging of the blower and front and rear pipelines during downtime.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

Reference signs: 1: hydrogen production device by water electrolysis; 2: oxygen preparation device; 3: $CO_2$ recovery device; 4: blower; 5: carbon-based denitrogenation gas mixer; 6: gas heat exchanger; 7: gas boiler; 8: flue gas dehydration unit; 9: $CO_2$ compressor; 10: nitrogen compressor; 11: chimney; 12: natural gas supply device; 504: outer cylinder; 501: oxygen inlet pipe; 502: circulating flue gas inlet pipe; 508: carbon-based denitrogenation gas outlet pipe; 503: gas distributor; 5031: first small holes; 507: gas collector; 5071: second small holes; 505: vertical fins; 506: horizontal fins; FIC: flow regulating valves; F: flow detector; T: temperature detector; P: pressure detector; and C: oxygen purity detector.

DETAILED DESCRIPTION

In order to more clearly illustrate the technical solutions of the embodiments of the present disclosure, the following briefly introduces the drawings that need to be used in the description of the embodiment. The accompanying drawings do not represent the entirety of the embodiments.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

Figure 1:
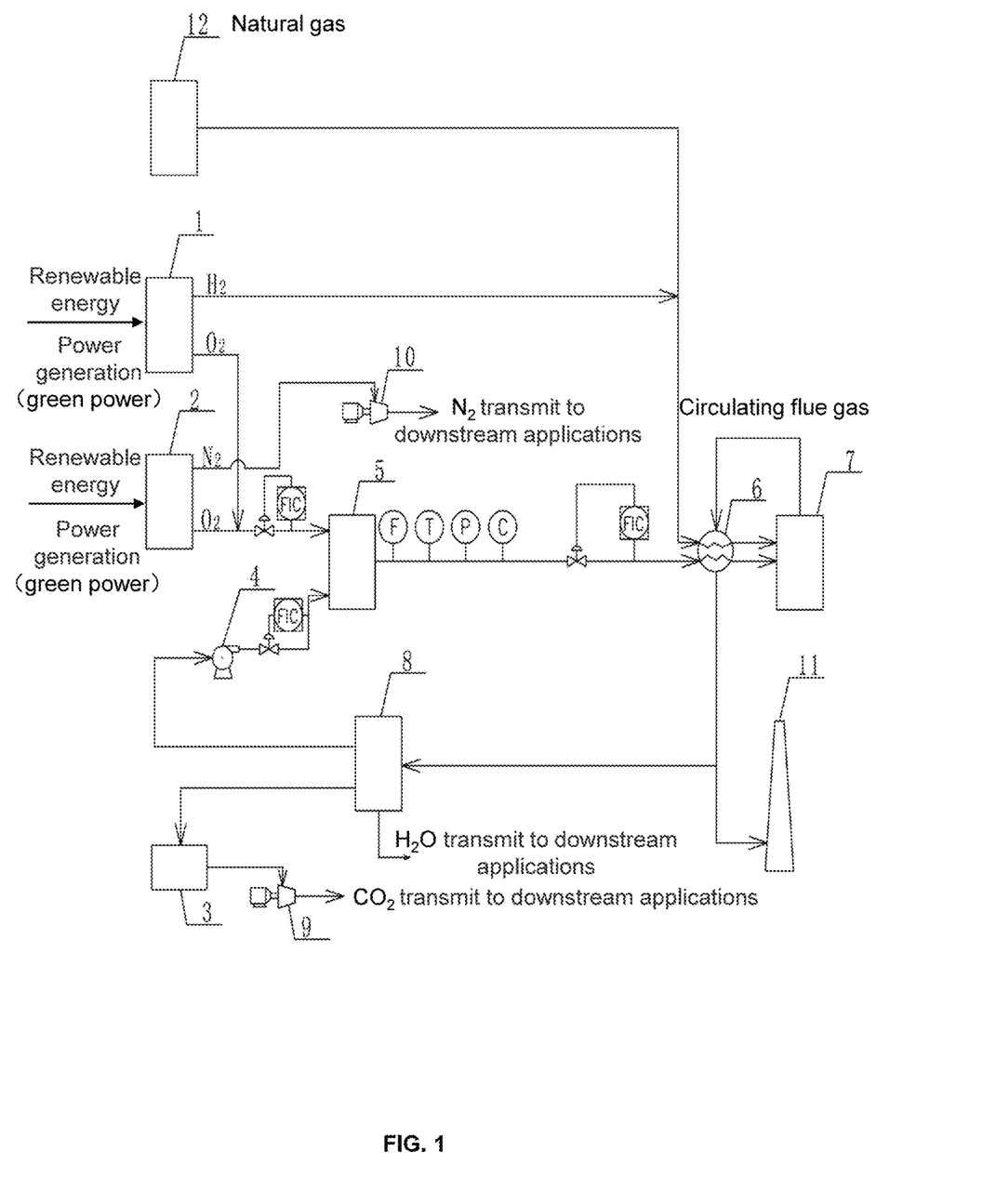
FIG. 1 is a schematic diagram illustrating a structure of a system for denitrogenation combustion and $CO_2$ capture and utilization in a gas boiler according to some embodiments of the present disclosure.

FIG. 1 is a schematic diagram illustrating a structure of a system for denitrogenation combustion and $CO_2$ capture and utilization in a gas boiler according to some embodiments of the present disclosure.

In some embodiments, a method for denitrogenation combustion and $CO_2$ capture and utilization in a gas boiler may be implemented by the system for denitrogenation combustion and $CO_2$ capture and utilization in the gas boiler. The system for denitrogenation combustion and $CO_2$ capture and utilization in the gas boiler may comprise a natural gas supply device 12, a hydrogen production device by water electrolysis 1, an oxygen preparation device 2, a nitrogen compressor 10, a carbon-based denitrogenation gas mixer 5, a gas heat exchanger 6, a gas boiler 7, a chimney 11, a flue gas dehydration device 8, a blower 4, a $CO_2$ recovery device 3, and a $CO_2$ compressor 9.

In some embodiments, the natural gas supply device 12 may be configured to supply natural gas. In some embodiments, a natural gas outlet of the natural gas supply device 12 may be connected with the gas heat exchanger 6 to feed the natural gas into the gas heat exchanger 6 for heat exchange.

In some embodiments, the hydrogen production device by water electrolysis 1 may be configured to prepare hydrogen and oxygen using a water electrolysis process.

In some embodiments, a purity of the hydrogen prepared by the hydrogen production device by water electrolysis 1 may be greater than 99.9%, and a purity of the oxygen prepared by the hydrogen production device by water electrolysis 1 may be greater than 99.2% without free water.

In some embodiments, the hydrogen production device by water electrolysis 1 my be connected with a green power device, and power for the hydrogen production device by water electrolysis may be supplied by the green power device located outside the system. The green power device refers to a device that generates green power using a renewable energy source such as wind, solar energy, biomass, or geothermal energy. Green power refers to power that is produced with zero or near-zero carbon dioxide emissions.

In some embodiments, a hydrogen outlet of the hydrogen production device by water electrolysis 1 may be connected with the gas heat exchanger 6, and the hydrogen prepared by the hydrogen production device by water electrolysis 1 may be fed into the gas heat exchanger 6 for heat exchange. In some embodiments, the hydrogen prepared by the hydrogen production device by water electrolysis 1 and the natural gas may be fed into the gas boiler to be used as combustion gas after heat exchange with the gas heat exchanger 6.

In some embodiments, an oxygen outlet of the hydrogen production device by water electrolysis 1 may be connected with the carbon-based denitrogenation gas mixer 5, and the oxygen prepared by the hydrogen production device by water electrolysis 1 and oxygen prepared by the oxygen preparation device 2 may be fed into the carbon-based denitrogenation gas mixer 5 as an oxygen source.

In some embodiments, a proportion of the hydrogen prepared by the hydrogen production device by water electrolysis 1 to a total amount of gas may be determined based on supply of the green power. In some embodiments, the proportion of the hydrogen prepared by the hydrogen production device by water electrolysis 1 to the total amount of gas may be within a range of 10%-20%. The total amount of gas refers to a total amount of the hydrogen and the natural gas.

In some embodiments, a proportion of the oxygen prepared by the hydrogen production device by water electrolysis 1 to an amount of oxygen fed into the carbon-based denitrogenation gas mixer 5 may be determined based on the supply of the green electricity. In some embodiments, the proportion of the oxygen prepared by the hydrogen production device by water electrolysis 1 to the amount of oxygen fed into the carbon-based denitrogenation gas mixer 5 may be within a range of 10%-20%.

In some embodiments, the oxygen preparation device 2 may be configured to prepare the oxygen and nitrogen.

In some embodiments, the oxygen preparation device 2 may be configured to prepare the oxygen using a deep cooling method. For example, the oxygen preparation device 2 may first compress, cool, and liquefy the air; and make gas and liquid contact with each other on a distillation plate based on differences in boiling points of the oxygen and nitrogen components to perform mass and heat exchange. Then the oxygen component with a high boiling point is continuously condensed into liquid from steam, while the nitrogen component with a low boiling point is continuously transferred to the steam, causing the nitrogen content of the rising steam to continuously increase, and the oxygen content of the downflow liquid to continuously increase, so that the oxygen and the nitrogen are separated.

In some embodiments, a purity of the oxygen prepared by the oxygen preparation device 2 may be 99.6 v % or more, a pressure of the oxygen prepared by the oxygen preparation device 2 may be within a range of 0.05-0.2 MPa without free water, and a purity of the nitrogen may be greater than 99.9v %.

In some embodiments, the oxygen preparation device 2 may be connected with the green power device, and power for the oxygen preparation device 2 may be supplied by the green power device outside the system.

In some embodiments, an oxygen outlet of the oxygen preparation device 2 may be connected with the carbon-based denitrogenation gas mixer 5. The oxygen prepared by the oxygen preparation device 2 and the oxygen prepared by the hydrogen production device by water electrolysis 1 may be fed into the carbon-based denitrogenation gas mixer 5 as the oxygen source.

In some embodiments, a nitrogen outlet of the oxygen preparation device 2 may be connected with the nitrogen compressor 10. The nitrogen compressor 10 may be connected with a nitrogen utilization device. In some embodiments, the nitrogen outlet of the oxygen preparation device 2 may also be connected with an inlet of the blower 4 to provide the nitrogen for purging and replacement of the blower 4 and front and rear pipelines of the blower 4 during downtime. More descriptions regarding the blower 4 may be found in related descriptions below.

In some embodiments, the nitrogen compressor 10 may configured to pressurize and transmit the nitrogen prepared by the oxygen preparation device 2 to the nitrogen utilization device.

In some embodiments, the carbon-based denitrogenation gas mixer 5 may configured to prepare carbon-based denitrogenation gas by mixing the oxygen prepared by the hydrogen production device by water electrolysis 1, the oxygen prepared by the oxygen preparation device 2, and circulating flue gas transmitted by the blower 4. The circulating flue gas inputted to the blower 4 is circulating flue gas after heat exchange by the gas heat exchanger and dehydration by the flue gas dehydration device.

In some embodiments, a material of the carbon-based denitrogenation gas mixer 5 may be stainless steel.

Figure 2:
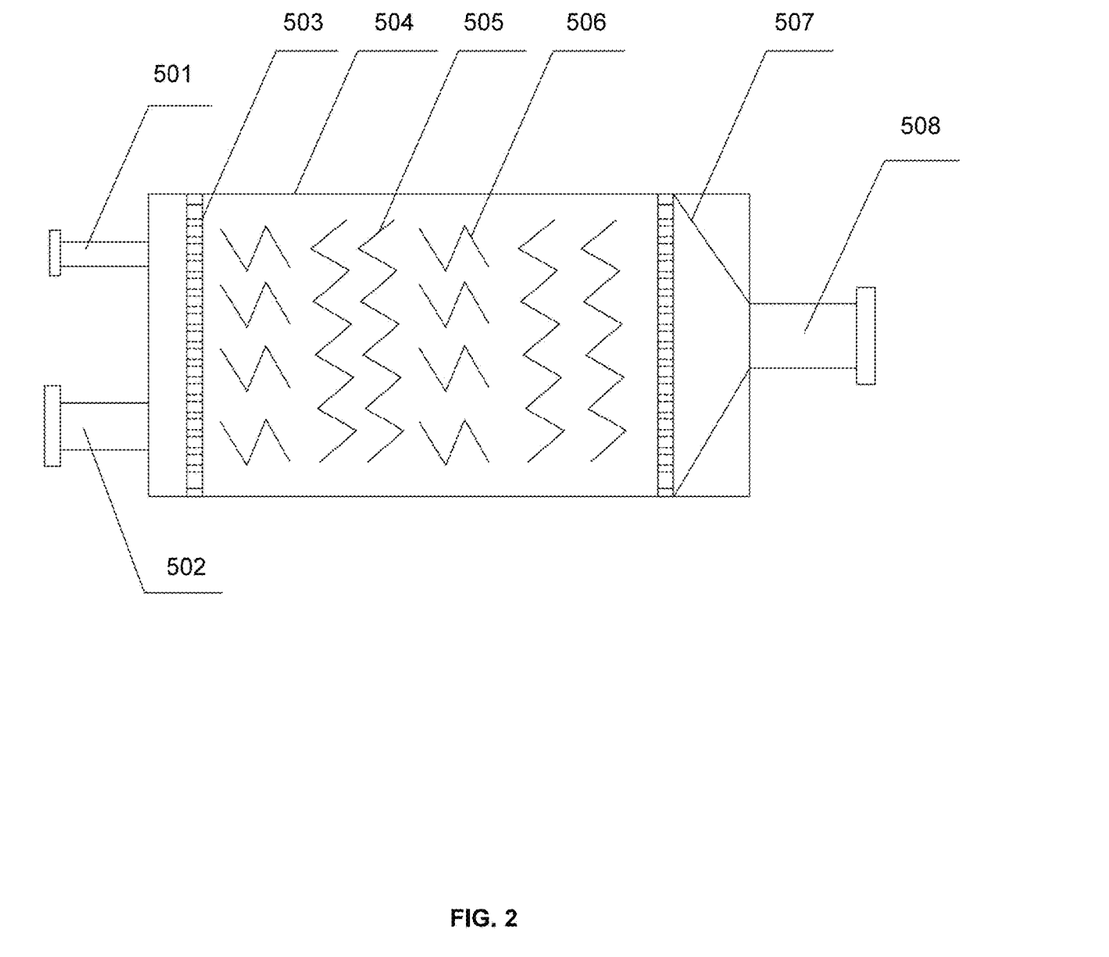
FIG. 2 is a schematic diagram illustrating a structure of a carbon-based denitrogenation gas mixer according to some embodiments of the present disclosure.
Figure 3:
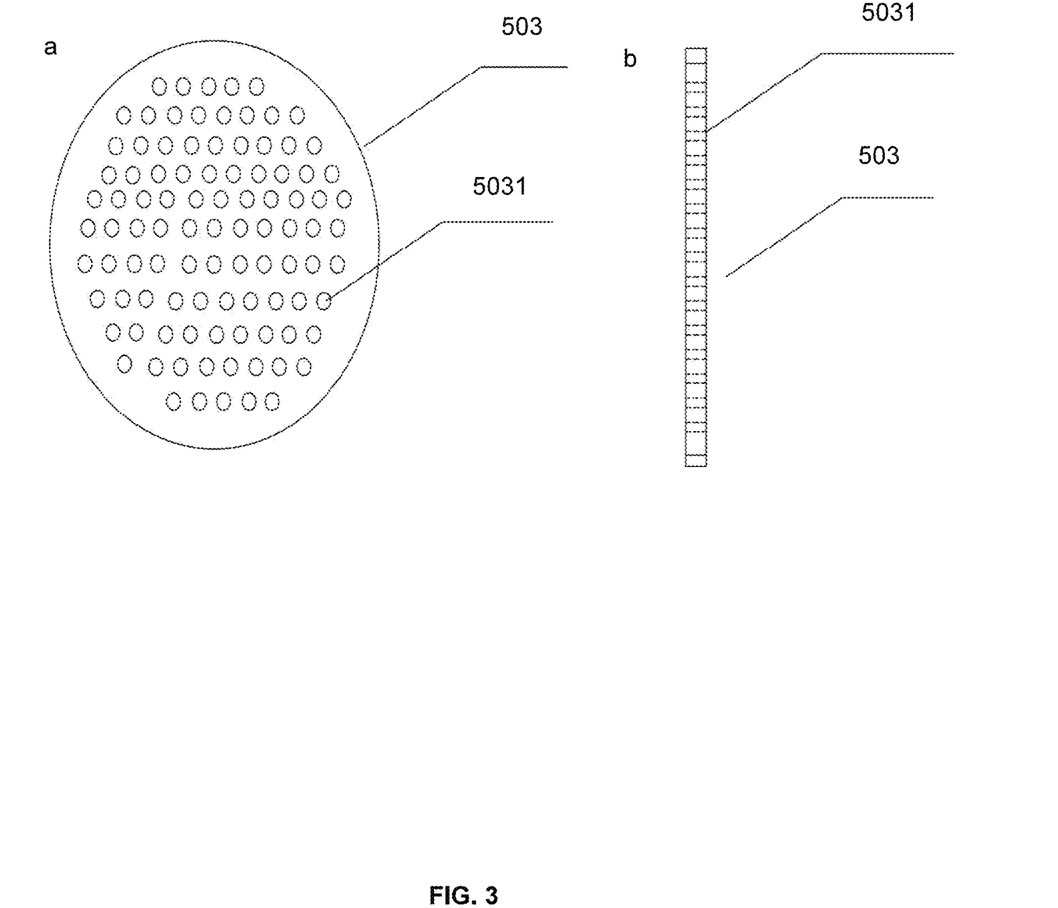
FIG. 3 is a schematic diagram illustrating a structure of a gas distributor in a carbon-based denitrogenation gas mixer according to some embodiments of the present disclosure.
Figure 4:
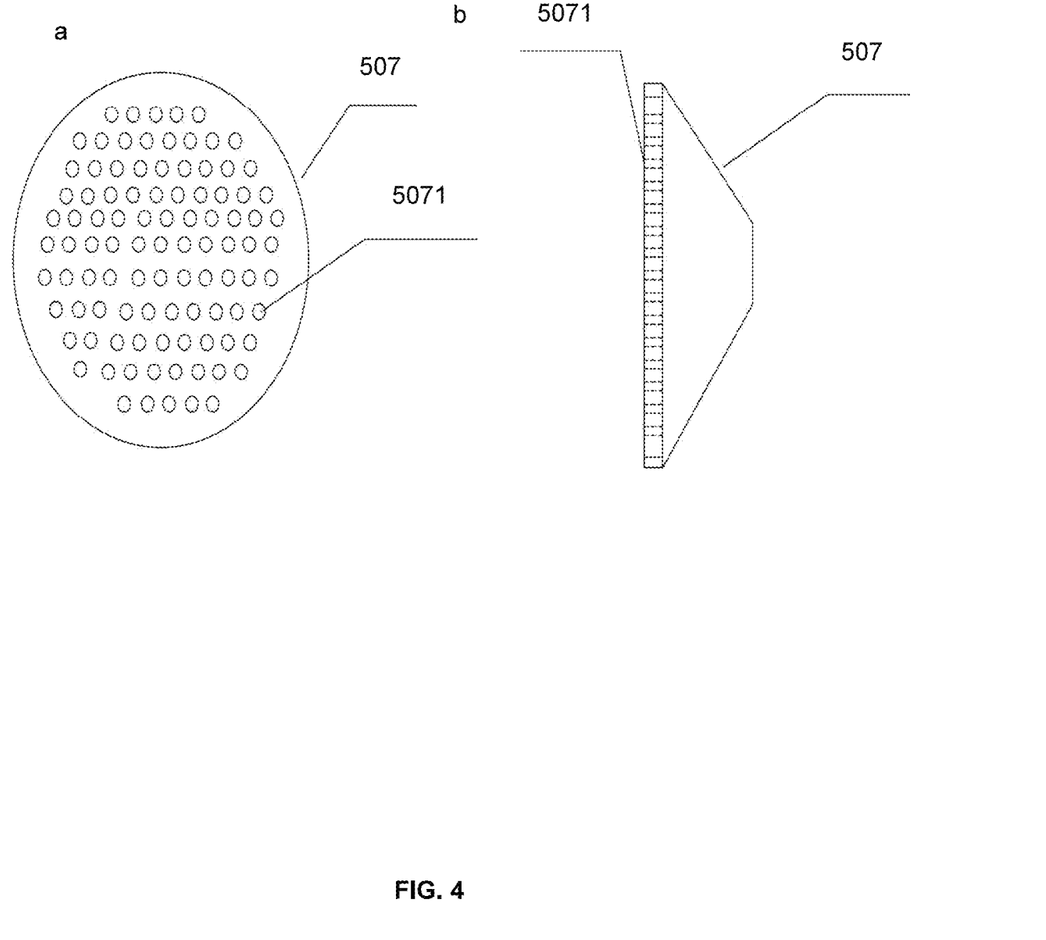
FIG. 4 is a schematic diagram illustrating a structure of a gas collector in a carbon-based denitrogenation gas mixer according to some embodiments of the present disclosure.

In some embodiments, as illustrated in FIGS. 2-4, the carbon-based denitrogenation gas mixer 5 may include an outer cylinder 504. An oxygen inlet pipe 501 and a circulating flue gas inlet pipe 502 may be disposed at one end of the outer cylinder 504, and a carbon-based denitrogenation gas outlet pipe 508 may be disposed at the other end of the outer cylinder 504. A gas distributor 503 may be disposed at an end of the outer cylinder 504 close to the oxygen inlet pipe 501 and the circulating flue gas inlet pipe 502. The gas distributor 503 may be a circular plate. The circular plate may be uniformly provided with a preset count of first small holes 5031. A gas collector 507 may be disposed at an end of the outer cylinder 504 close to the carbon-based denitrogenation gas outlet pipe 508. The gas collector 507 may be a hollow frustum cone shape. A large round end of the hollow frustum cone shape may be a circular plate. The circular plate may be uniformly provided with a preset count of second small holes 5071. A small round end of the hollow frustum cone shape may be open and communicated with the carbon-based denitrogenation gas outlet tube 508. A preset count of horizontal fins 506 and vertical fins 505 may be spaced between the gas distributor 503 and the gas collector 507 within the outer cylinder 504.

In some embodiments, the oxygen transmitted by the hydrogen production device by water electrolysis 1 and the oxygen preparation device 2 may enter the outer cylinder 504 from the oxygen inlet pipe 501. The circulating flue gas transmitted by the blower 4 may enter the outer cylinder 504 from the circulating flue gas inlet pipe 502. The oxygen and the circulating flue gas may be preliminarily mixed before entering the gas distributor 503, then pass through the first small holes 5031 uniformly distributed on the gas distributor 503, and then pass through the spaced horizontal fins 506 and vertical fins 505. Flow directions of the oxygen and the circulating flue gas may continuously change in the spaced horizontal fins 506 and the vertical fins 505, so that the oxygen and the circulating flue gas may be mixed fully and uniformly. Then the uniformly mixed oxygen and circulating flue gas may pass through the second small holes 5071 uniformly distributed on the gas collector 507 to be collected into the carbon-based denitrogenation gas outlet pipe 508, and finally discharged from the carbon-based denitrogenation gas mixer 5.

In some embodiments, the carbon-based denitrogenation gas mixer 5 may include at least two oxygen inlet pipes 501 and at least two circulating flue gas inlet pipes 502. The at least two oxygen inlet pipes and the at least two circulating flue gas inlet pipes may be staggered. For example, the at least two oxygen inlet pipes 501 may be staggered vertically, the at least two circulating flue gas inlet pipes 502 may be staggered in a left and right direction, and the at least two oxygen inlet pipes 501 and the at least two circulating flue gas inlet pipes 502 may be arranged 90° to each other.

In some embodiments of the present disclosure, the at least two oxygen inlet pipes 501 and the at least two circulating flue gas inlet pipes 502 may be staggered to disperse airflow to increase a contact area of the airflow, allowing for full contact between the oxygen and the circulating flue gas.

In some embodiments, a distribution spacing between the horizontal fins 506 and the vertical fins 505 close to the end of the gas distributor 503 may be less than a distribution spacing between the horizontal fins 506 and the vertical fins 505 close to the end of the gas collector 507. In some embodiments, the horizontal fins 506 and the vertical fins 505 close to the end of the gas distributor 503 may be denser. The horizontal fins 506 and the vertical fins 505 close to the end of the gas collector 507 may be sparser.

In some embodiments of the present disclosure, since the circulating flue gas is at a relatively high temperature and has a relatively large temperature difference when the circulating flue gas first enters the carbon-based denitrogenation gas mixer 5, resulting in a relatively large gas pressure difference, the distribution spacing between the horizontal fins 506 and the vertical fins 505 close to the end of the gas distributor 503 may be smaller, which is conducive to reducing the gas pressure difference.

In some embodiments, a thickness of the horizontal fins 506 and the vertical fins 505 close to the end of the gas distributor 503 may be greater than a thickness of the horizontal fins 506 and the vertical fins 505 close to the end of the gas collector 507. The thickness of the horizontal fins 506 or the vertical fins 505 may be a length of the horizontal fins 506 or the vertical fins 505 in an axial direction along the outer cylinder 504 of the carbon-based denitrogenation gas mixer 5.

In some embodiments of the present disclosure, a large thickness of the horizontal fins 506 and the vertical fins 505 close to the end of the gas distributor 503 may prevent damage to the fins from a relatively large gas pressure difference.

In some embodiments, the oxygen outlet of the hydrogen production device by water electrolysis 1 and the oxygen outlet of the oxygen preparation device 2 may be connected with the carbon-based denitrogenation gas mixer 5. A second flow regulating valve may be disposed on a connection pipeline between the oxygen outlet of the hydrogen production device by water electrolysis 1 and the oxygen outlet of the oxygen preparation device 2 and the carbon-based denitrogenation gas mixer 5. The second flow regulating valve may be configured to regulate a flow rate of gas in the connection pipeline between the oxygen outlet of the hydrogen production device by water electrolysis 1 and the oxygen outlet of the oxygen preparation device 2 and the carbon-based denitrogenation gas mixer 5.

In some embodiments, the carbon-based denitrogenation gas mixer 5 may be connected with the gas heat exchanger 6. A connection pipeline between the carbon-based denitrogenation gas mixer 5 and the gas heat exchanger 6 may be provided with a flow detector, a temperature detector, a pressure detector, an oxygen purity detector, and a third flow regulating valve. The third flow regulating valve may be configured to regulate a flow rate of gas in the connection pipeline between the carbon-based denitrogenation gas mixer 5 and the gas heat exchanger 6. The flow detector may be configured to detect the flow rate of gas in the connection pipeline between the carbon-based denitrogenation gas mixer 5 and the gas heat exchanger 6. The temperature detector may be configured to detect a temperature of gas in the connection pipeline between the carbon-based denitrogenation gas mixer 5 and the gas heat exchanger 6. The pressure detector may be configured to detect a gas pressure in the connection pipeline between the carbon-based denitrogenation gas mixer 5 and the gas heat exchanger 6. The oxygen purity detector may be configured to detect an oxygen purity and an oxygen concentration in the connection pipeline between the carbon-based denitrogenation gas mixer 5 and the gas heat exchanger 6. As illustrated in FIG. 1, "F" denotes the flow detector, "T" denotes the temperature detector, "P" denotes the pressure detector, and "C" denotes the oxygen purity detector.

In some embodiments, the oxygen prepared by the hydrogen production device by water electrolysis 1 and the oxygen prepared by the oxygen preparation device 2 may enter the outer cylinder 504 through the oxygen inlet pipe, and the circulating flue gas transmitted by blower 4 may enter the outer cylinder 504 through the circulating flue gas inlet pipe. The oxygen and the circulating flue gas are preliminarily mixed into a gas mixture before entering the gas distributor 503. The gas mixture may pass through the first small holes 5031 on the gas distributor, and then pass through the horizontal fins 506 and the vertical fins 505 for secondary mixing to obtain the carbon-based denitrogenation gas. The carbon-based denitrogenation gas may pass through the second small holes 5071 uniformly distributed on the gas collector 507 to be collected into the carbon-based denitrogenation gas outlet pipe and discharged from the carbon-based denitrogenation gas mixer 5.

In some embodiments, the gas heat exchanger 6 may be configured to perform heat exchange between the natural gas supplied by the natural gas supply device 12, the hydrogen prepared by the hydrogen production device by water electrolysis 1, the carbon-based denitrogenation gas provided by the carbon-based denitrogenation gas mixer 5, and the circulating flue gas discharged from the gas boiler 7 to heat the natural gas, the hydrogen and the carbon-based denitrogenation gases are using waste heat of the circulating flue gas discharged from the gas boiler 7. The circulating flue gas refers to flue gas generated by the gas boiler 7 and can be recycled.

In some embodiments, a circulating flue gas outlet of the gas boiler 7 may be connected with the gas heat exchanger 6. The gas heat exchanger 6 may be connected with the chimney 11 and the flue gas dehydration device 8, respectively.

In some embodiments, the hydrogen outlet of the hydrogen production device by water electrolysis 1 and the natural gas outlet of the natural gas supply device 12 may be connected with the gas heat exchanger 6.

In some embodiments, a hydrogen and natural gas outlet and a carbon-based denitrogenation gas outlet of the gas heat exchanger 6 may be connected with the gas boiler 7.

In some embodiments, the gas boiler 7 may be configured to burn the natural gas and the hydrogen prepared by the hydrogen production device by water electrolysis to generate heat.

In some embodiments, the gas boiler 7 may include a circulating flue gas outlet. The circulating flue gas outlet may be connected with the gas heat exchanger 6.

In some embodiments, the chimney 11 may be configured to vent the circulating flue gas within the gas boiler 7 under an abnormal operating condition or when an amount of the circulating flue gas is excessive. The abnormal operating condition refers to a situation of an abnormality in the combustion of the gas boiler 7, such as an excessive gas pressure in the gas boiler 7.

In some embodiments, the flue gas dehydration device 8 may be configured to dehydrate the circulating flue gas after heat exchange. For example, the flue gas dehydration device 8 may separate saturated water from the circulating flue gas after cooling.

In some embodiments, one end of the flue gas dehydration device 8 may be connected with the circulating flue gas outlet of the gas heat exchanger 6, and the other end of the flue gas dehydration device 8 may be connected with the blower 4 and the $CO_2$ recovery device 3, respectively.

In some embodiments, an outlet of the flue gas dehydration device 8 may be connected with the blower 4.

In some embodiments, the blower 4 may be configured to pressurize and transmit a first portion of the circulating flue gas after heat exchange and dehydration to the carbon-based denitrogenation gas mixer 5.

In some embodiments, the inlet of the blower 4 may be connected with the flue gas dehydration device 8, and an outlet of the blower 4 may be connected with the carbon-based denitrogenation gas mixer 5 to introduce the first portion of the circulating flue gas after heat exchange and dehydration into the blower 4 to be pressurized by the blower 4 and then introduced into the carbon-based denitrogenation gas mixer 5.

In some embodiments, a first flow regulating valve may be disposed on a connection pipeline between the outlet of the blower 4 and the carbon-based denitrogenation gas mixer 5. The first flow regulating valve may be configured to regulate a flow rate of gas in the connection pipeline between the blower 4 and the carbon-based denitrogenation gas mixer 5.

In some embodiments, the outlet of the blower 4 may be provided with a safety valve and a back pressure valve. When a pressure at the outlet of the blower 4 is too high, the circulating flue gas may return to the inlet of the blower 4 in time, preventing the high pressure at the outlet of the blower 4 from causing damage to the blower 4.

In some embodiments, a flue gas treatment device (not shown in FIG. 1) may be disposed on the connection pipeline between the flue gas dehydration device 8 and the blower 4. The flue gas treatment device may be configured to filter impurities from the first portion of the circulating flue gas after heat exchange and dehydration, such as particulate matter, sulfur oxides, or the like.

In some embodiments of the present disclosure, the flue gas treatment device may be disposed on the connection pipeline between the flue gas dehydration device 8 and the blower 4, so that the circulating flue gas transmitted to the blower can be purer, thereby avoiding the unfavorable influence of the impurities on the overall device, and increasing the service life of the overall device.

In some embodiments, the blower 4 may include a variable frequency blower.

In some embodiments of the present disclosure, the flow rate of gas may be automatically regulated using the variable frequency blower, thereby simplifying the structure of the system, and more accurately regulating the flow rate of gas.

In some embodiments, the $CO_2$ recovery device 3 may be configured to purify and deoxygenate a second portion of the circulating flue gas after heat exchange and dehydration to produce a $CO_2$ product.

In some embodiments, one end (i.e., a circulating flue gas inlet) of the $CO_2$ recovery device 3 may be connected with the flue gas dehydration device 8 to receive the second portion of the circulating flue gas after heat exchange and dehydration.

In some embodiments, the $CO_2$ recovery device may perform purification and deoxygenation by a preset method. For example, the $CO_2$ recovery device may perform purification and deoxygenation by a catalytic reduction method or a liquid absorption method.

In some embodiments, the $CO_2$ recovery device 3 may also perform deoxygenation using a deoxidizer, by which trace dust may be removed during deoxygenation.

In some embodiments, a $CO_2$ outlet of the $CO_2$ recovery device 3 may be connected with the $CO_2$ compressor 9. The $CO_2$ compressor may be connected with a $CO_2$ utilization device (not shown in FIG. 1).

In some embodiments, the $CO_2$ compressor 9 may be configured to pressurize and transmit the $CO_2$ product prepared by the $CO_2$ recovery device 3 to the $CO_2$ utilization device.

In some embodiments, the $CO_2$ utilization device may be configured to use the $CO_2$ product transmitted by the $CO_2$ compressor. In some embodiments, the $CO_2$ utilization device may use the $CO_2$ product in oil field extraction and sequestration, steel slag mineralization, concrete mineralization, red mud curing, chemical industry (mainly including production of products such as methanol, urea, carbonate, carbon monoxide, etc.), food storage and preservation through $CO_2$, etc.

In some embodiments, when the field in which the $CO_2$ utilization device uses the $CO_2$ product is a field that is not sensitive to an oxygen content, the $CO_2$ recovery device 3 may not be arranged, and the $CO_2$ compressor may directly pressurize and transmit the second portion of the circulating flue gas after heat exchange and dehydration to the $CO_2$ utilization device.

In some embodiments, the system for denitrogenation combustion and $CO_2$ capture and utilization in the gas boiler may further include an air combustion fan (not shown in FIG. 1). In some embodiments, the air combustion fan may be connected with the gas heat exchanger 6.

In some embodiments, the air combustion fan may be configured to supplement air in case of insufficient circulating flue gas or switch to air combustion without disturbance in case of an abnormal condition of carbon-based denitrogenation gas combustion, to ensure normal oxygenation and combustion of the gas boiler 7. The abnormal situation may include insufficient combustion of the gas boiler 7, etc.

Some embodiments of the present disclosure further provide a method for denitrogenation combustion and $CO_2$ capture and utilization in a gas boiler. The method may comprise the following operations.

S1: In an initial phase, the gas boiler 7 may utilize air combustion to produce circulating flue gas.

S2: After the circulating flue gas is introduced into the gas heat exchanger 7 from the gas boiler 7:

When carbon-based denitrogenation gas is not introduced into the gas heat exchanger, heat exchange may be performed between the circulating flue gas and natural gas and hydrogen prepared by the hydrogen production device by water electrolysis 1 to recover waste heat of the circulating flue gas.

When the carbon-based denitrogenation gas is introduced into the gas heat exchanger 6, heat exchange may be performed between the circulating flue gas and the natural gas, the hydrogen prepared by the hydrogen production device by water electrolysis, and the carbon-based denitrogenation gas prepared by the carbon-based denitrogenation gas mixer to recover the waste heat of the circulating flue gas. The carbon-based denitrogenation gas may raise a temperature by 30° C.-50° C. through heat exchange to enter the gas boiler to be used for supporting combustion, gradually replacing the air combustion until carbon-based denitrogenation gas combustion enters into normal operation. The natural gas and the hydrogen may raise a temperature by 30° C.-50° C. through heat exchange to enter the gas boiler to be used as the combustion gas. A purity of the hydrogen prepared by the hydrogen production device by water electrolysis may be 99.9 v % or more.

S3: the circulating flue gas after heat exchange may be introduced into the flue gas dehydration device 8 for dehydration through the circulating flue gas outlet of the gas heat exchanger 6, wherein a $CO_2$ concentration of the circulating flue gas after heat exchange, dehydration, and circulating enrichment may be 95 v % or more.

S4: the first portion of the circulating flue gas after heat exchange and dehydration may be introduced into the blower 4 through the flue gas dehydration device 7, and then pressurized by the blower 4 and introduced into the carbon-based denitrogenation gas mixer 5;

S5: The oxygen prepared by the oxygen preparation device 2 and the hydrogen production device by water electrolysis 1 may be introduced into the carbon-based denitrogenation gas mixer 5 through the oxygen outlet of the oxygen preparation device 2 and the oxygen outlet of the hydrogen production device by water electrolysis 1, respectively, the carbon-based denitrogenation gas may be obtained by mixing the circulating flue gas after heat exchange, dehydration, and pressurization and the oxygen through the carbon-based denitrogenation gas mixer 5, and the carbon-based denitrogenation gas may be introduced into the gas heat exchanger 6 for heat exchange before introducing into the gas boiler 7. A purity of the oxygen prepared by the oxygen preparation device 2 may be 99.6 v % or more, and a pressure of the oxygen prepared by the oxygen preparation device 2 may be within a range of 0.05-0.2 MPa without free water. A purity of the oxygen prepared by the hydrogen production device by water electrolysis 1 may be 99.2 v % or more without free water. An oxygen concentration of the carbon-based denitrogenation gas may be within a range of 18-35 v %, and a pressure of the carbon-based denitrogenation gas may be within a range of 0.05-0.2 MPa.

S6: The second portion of the circulating flue gas after heat exchange and dehydration may be introduced into a $CO_2$ recovery device for purification and deoxygenation through the flue gas dehydration device 8 to obtain the $CO_2$ product, and the $CO_2$ product may be pressurized and transmitted to the $CO_2$ utilization device through the $CO_2$ compressor 9.

S7: The nitrogen prepared by the oxygen preparation device 2 may be introduced into the nitrogen compressor 10 through the oxygen preparation device 2, and pressurized and transmitted to a nitrogen utilization device through the nitrogen compressor 10. A purity of the nitrogen prepared by the oxygen preparation device may be 99.9 v % or more.

In some embodiments of the present disclosure, the $CO_2$-rich circulating flue gas and the oxygen may be prepared into the carbon-based denitrogenation gas with the required oxygen concentration of the gas boiler 7 to be used for supporting combustion for the gas boiler 7. Meanwhile, the natural gas and the hydrogen prepared by the hydrogen production device by water electrolysis may be used as the combustion gas, $CO_2$ in the high temperature region of the combustion of the gas boiler 7 may be replaced by the nitrogen, avoiding the generation of thermal NOx in the combustion process, achieving ultra-low NOx emissions, and greatly increasing the intensity of radiation in the gas boiler 7, thereby realizing a significant effect of energy conservation and consumption reduction. In addition, the $CO_2$ concentration in the circulating flue gas is increased, making $CO_2$ capture easier, thereby realizing the method and the system for denitrogenation combustion and $CO_2$ capture and utilization in the gas boiler 7 with better combustion effect, higher $CO_2$ recovery efficiency, and environmental protection.

In some embodiments, the system for denitrogenation combustion and $CO_2$ capture and utilization in the gas boiler may further include a control device. The control device may be configured to control operation of at least one device of the system for denitrogenation combustion and $CO_2$ capture and utilization in the gas boiler.

In some embodiments, the control device may be configured to: obtain an oxygen concentration detected by the oxygen purity detector; in response to determining that the oxygen concentration satisfies a first preset condition, determine, based on the oxygen concentration, a first distribution value and a second distribution value through a preset algorithm; send the first distribution value and the second distribution value to the hydrogen production device by water electrolysis 1 and the oxygen preparation device 2, respectively, to control the hydrogen production device by water electrolysis 1 and the oxygen preparation device 2 to operate based on the first distribution value and the second distribution value, respectively.

In some embodiments, the first preset condition may include that the oxygen concentration of the carbon-based denitrogenation gas is less than a concentration threshold. The concentration threshold refers to a minimum value of the oxygen concentration in the carbon-based denitrogenation gas that meets combustion requirements. The concentration threshold may be preset, such as 18v %.

The first distribution value refers to operating power of the hydrogen production device by water electrolysis.

The second distribution value refers to operating power of the oxygen preparation device.

In some embodiments, the preset algorithm may include redistributing total power of the green power device based on an amount of oxygen produced per unit time by the hydrogen production device by water electrolysis 1 and the oxygen preparation device 2. For example, the manner of redistribution may include, but is not limited to, (1) if the amount of oxygen produced per unit time by the hydrogen production device by water electrolysis 1 is greater than the amount of oxygen produced per unit time by the oxygen preparation device 2, increasing power distributed to the hydrogen production device by water electrolysis 1 and decreasing power of the oxygen preparation device 2; and (2) if the amount of oxygen produced per unit time by the hydrogen production device by water electrolysis 1 is less than the amount of oxygen produced per unit time by the oxygen preparation device 2, decreasing the power distributed to the hydrogen production device by water electrolysis 1 and increasing the power of the oxygen preparation device 2.

In some embodiments, when the first distribution value and the second distribution value are calculated using the predetermined algorithm, it is necessary to satisfy that a sum of the power of the hydrogen production device by water electrolysis 1 and the power of the oxygen preparation device 2 is not greater than the total power of the green power device. Meanwhile, it is necessary to satisfy that a sum of an amount of oxygen produced by the hydrogen production device by water electrolysis 1 and an amount of oxygen produced by the oxygen preparation device 2 is not less than an amount of oxygen produced corresponding to a concentration threshold, and is not greater than an amount of oxygen produced corresponding to an upper concentration limit.

The oxygen produced per unit time refers to an amount of oxygen produced by the hydrogen production device by water electrolysis 1 or the oxygen preparation device 2 under a rated power condition. The unit time may be preset, such as 1 hour. The upper concentration limit refers to a maximum oxygen concentration in the carbon-based denitrogenation gas that meets the combustion requirements. The upper concentration limit may be preset, such as 35v %.

In some embodiments, the amount of oxygen produced per unit time may be obtained based on an experiment. The rated power in the experiment may be preset.

The amount of oxygen produced corresponding to the concentration threshold refers to a sum of the amount of oxygen produced by the hydrogen production device by water electrolysis 1 and the oxygen preparation device 2 required when the oxygen concentration in the carbon-based denitrogenation gas is the concentration threshold. The amount of oxygen produced corresponding to the upper concentration limit refers to a sum of the amount of oxygen produced by the hydrogen production device by water electrolysis 1 and the oxygen preparation device 2 required when the oxygen concentration in the carbon-based denitrogenation gas is the upper concentration limit.

In some embodiments, the control device may determine the amount of oxygen produced corresponding to the concentration threshold based on a total amount of gas entering the gas boiler 7 and the concentration threshold. For example, if the total amount of gas entering the gas boiler 7 is 100 cubic meters/h and the concentration threshold is 20v %, the amount of oxygen produced corresponding to the concentration threshold may be 20 cubic meters/h. Similarly, the control device may determine the amount of oxygen produced corresponding to the upper concentration limit based on the total amount of gas entering the gas boiler 7 and the upper concentration limit. The total amount of gas entering the gas boiler 7 may include the natural gas transmitted by the natural gas supply device 12 and the hydrogen prepared by the hydrogen production device by water electrolysis 1. The total amount of gas entering the gas boiler 7 may be obtained by the flow detector.

In some embodiments of the present disclosure, in response to determining that the purity of the oxygen is insufficient to satisfy a requirement for normal combustion in the gas boiler 7, the first distribution value and the second distribution value may be determined through the preset algorithm to increase the operating power of the hydrogen production device by water electrolysis 1 and the oxygen preparation device 2 that produces more oxygen, thereby increasing the oxygen concentration in the carbon-based denitrogenation gas.

In some embodiments, in response to determining that the first distribution value and the second distribution value cannot be determined through the preset algorithm, the control device may generate and send a gas supplementing instruction to control the air combustion fan to supplement gas to the gas heat exchanger 6.

The gas supplementing instruction may be used to control the air combustion fan to start and supplement air to the gas heat exchanger 6 to ensure normal combustion in the gas boiler 7.

In some embodiments of the present disclosure, the gas supplementing instruction enables gas supplementing when the concentration of the oxygen prepared by the hydrogen production device by water electrolysis and the oxygen preparation device are unable to satisfy the requirement of normal combustion in the gas boiler 7 due to insufficient total power of the green power device, to ensure normal combustion in the gas boiler 7.

In some embodiments, a flue gas circulation pump may be disposed on the connection pipeline between the circulating flue gas outlet and the gas heat exchanger 6. The flue gas circulation pump may be configured to draw the circulating flue gas out of the gas boiler 7 and into the gas heat exchanger.

In some embodiments, sensing instruments may be disposed within the gas boiler 7, at the circulating flue gas outlet, and on a connection pipeline between the gas heat exchanger 6 and the chimney 11. The sensing instruments may be configured to acquire sensing data. The sensing data may reflect a combustion state within the gas boiler 7.

In some embodiments, the sensing instruments may include a pressure sensor, a flow rate sensor, a temperature sensor, etc. Correspondingly, the sensing data may include at least one of a gas pressure, a gas flow rate, and a gas temperature.

In some embodiments, a boiler room in which the gas boiler 7 is located may be provided with the sensing instruments. Correspondingly, the sensing data may also include an environmental parameter. In some embodiments, the sensing instruments provided in the boiler room may include a temperature sensor, a humidity sensor, a gas detector, a wind sensor, etc.

The environmental parameter refers to data characterizing an environment in which the gas boiler 7 is located. In some embodiments, the environmental parameters may include an ambient temperature, an ambient humidity, gas quality, a wind speed, and a wind direction. The gas quality may characterize the quality of gas. In some embodiments, the gas quality may be determined based on a carbon dioxide content contained in the gas obtained by the gas detector. For example, standard gas has a carbon dioxide content of no more than 3.0%. If the gas detector detects a carbon dioxide content of 2% in the gas, it indicates that the current gas is of high quality.

In some embodiments, the environmental parameter may be obtained by the sensing instruments provided in the boiler room. The boiler room refers to a space in which the gas boiler 7 is located.

In some embodiments of the present disclosure, the environmental parameter may reflect an environmental condition in which the gas boiler 7 is located, which in turn facilitates determination of target operating parameters that are more realistic based on the sensing data.

In some embodiments, the control device may be in communicating connection with the sensing instruments disposed within the gas boiler 7, at the circulating flue gas outlet, and on the connection pipeline between the gas heat exchanger 6 to the chimney 11, and may be in communicating connection with the sensing instruments provided within the boiler room in which the gas boiler 7 is located to obtain the sensing data.

In some embodiments, the control device may be further configured to: determine the target operating parameters from a set of candidate operating parameters based on the sensing data; and control operation of a target device based on the target operating parameters.

The target operating parameters refer to parameters for controlling the operation of the target device.

In some embodiments, the target device may include at least one of the flue gas circulation pump, the blower 4, the hydrogen production device by water electrolysis 1, the oxygen preparation device 2, the nitrogen compressor 10, and the second flow regulating valve.

In some embodiments, the target operating parameters may include at least one of operating power of at least one of the flue gas circulation pump, the blower 4, the hydrogen production device by water electrolysis 1, the oxygen preparation device 2, and the nitrogen compressor 10, start/stop time of the flue gas circulation pump, and an opening degree of the second flow regulating valve. Descriptions regarding the second flow regulating valve may be found in FIG. 1 and related descriptions thereof.

In some embodiments, the set of candidate operating parameters may include a set of mappings consisting of a plurality of candidate operating parameters and boiler thermal efficiencies corresponding to the plurality of candidate operating parameters. The candidate operating parameters refer to alternative operating parameters of the target device.

The boiler thermal efficiency characterizes a proportion of heat produced by a boiler to fuel heat. The fuel heat refers to an amount of heat produced when the amount of gas entering the gas boiler 7 is completely burned.

In some embodiments, the control device may calculate the fuel heat based on the amount of gas entering the gas boiler 7 and a gas combustion heat standard. The gas combustion heat standard refers to standard heat produced by combustion per unit amount of gas. For example, the control device may calculate the fuel heat by multiplying the amount of gas entering the gas boiler 7 by the gas combustion heat standard.

In some embodiments, the amount of gas entering the gas boiler 7 may be obtained by the flow detector.

In some embodiments, the control device may determine the amount of heat produced by the boiler through a preset heat meter based on an amount of temperature change of steam or hot water within the gas boiler 7. The amount of temperature change refers to a temperature at which the steam or the hot water within the gas boiler 7 increases after being heated. In some embodiments, the control device may obtain the amount of temperature change through the temperature sensor disposed within the gas boiler 7.

In some embodiments, the preset heat meter may be preset based on historical experience, including a correspondence relationship between a plurality of amounts of temperature change and the heat produced by the boiler corresponding plurality of amounts of temperature change.

In some embodiments, the control device may determine the set of candidate operating parameters in various ways. In some embodiments, the control device may obtain initial operating parameters and conduct multiple rounds of experimental testing based on the initial operating parameters; and determine the set of candidate operating parameters based on test results of the multiple rounds of experimental testing.

The initial operating parameters refer to desired operating parameters of the target device when theoretical gas compositions are generated. The theoretical gas compositions refer to gas composition ratios most suitable for combustion in the gas boiler 7. The theoretical gas compositions may include ratios of components such as combustion supporting gas and combustion gas. For example, the theoretical gas compositions may include an oxygen concentration of 27v %. In some embodiments, the theoretical gas compositions may be preset based on the historical experience.

In some embodiments, the control device may determine the initial operating parameters based on the theoretical gas compositions. For example, the control device may query, based on the theoretical gas compositions, reference operating parameters corresponding to the theoretical gas compositions in a preset correspondence table to determine the reference operating parameters as the initial operating parameters. The preset correspondence table may be preset, and may include a plurality of sets of theoretical gas compositions and reference operating parameters corresponding to plurality of sets of theoretical gas compositions.

In some embodiments, the initial operating parameters may include at least one of initial operating power of at least one of the flue gas circulation pump, the blower 4, the hydrogen production device by water electrolysis 1, the oxygen preparation device 2, the nitrogen compressor 10, initial start/stop time of the flue gas circulation pump, and an initial opening degree of the second flow regulating valve.

The initial operating power refers to desired operating power of at least one of the flue gas circulation pump, the blower 4, the hydrogen production device by water electrolysis 1, the oxygen preparation device 2, and the nitrogen compressor 10 when the theoretical gas compositions are generated.

The initial start/stop time of the flue gas circulation pump refers to desired start/stop time of the flue gas circulation pump when the theoretical gas compositions are generated.

The initial opening degree of the second flow regulating valve refers to a desired opening of the second flow regulating valve when the theoretical gas compositions are generated.

In some embodiments, when multiple rounds of experimental testing conducted based on the initial operating parameters, the control device may change one of the initial operating parameters while keeping other parameters constant to determine a coefficient of influence of the changed parameter on the thermal efficiency of the boiler. The changed parameter in each round of testing refers to a test operating parameter in the round of experimental testing. The constant parameters refer to fixed operating parameters in the round of experimental testing. The test operating parameter and the fixed opening parameters in each round of experimental testing may constitute the candidate operating parameters.

In some embodiments, the test results of the multiple rounds of experimental testing may include the coefficient of influence of the test operating parameter of each round of testing on the thermal efficiency of the boiler.

The coefficient of influence characterizes a degree of influence of the parameter on the thermal efficiency of the boiler. The larger the coefficient of influence, the greater the influence of the parameter on the thermal efficiency of the boiler.

In some embodiments, for each parameter of the initial operating parameters, the control device may determine, through multiple rounds of experimental testing, the coefficient of influence for each parameter of the initial operating parameters. For example, the control device may conduct a round of gas combustion experiments based on the initial operating parameters to obtain the thermal efficiencies of the boiler corresponding to the initial operating parameters. When the coefficient of influence of one parameter (i.e., the test operating parameter) of the initial operating parameters is confirmed, the test operating parameter may be adjusted based on a preset adjustment amplitude in each round of experimental testing, and other parameters (i.e., the constant operating parameters) of the initial operating parameters may be controlled to be fixed in multiple rounds of experimental testing to carry out gas combustion experiments to obtain the thermal efficiencies of the boiler corresponding to the test operating parameter and the fixed operating parameters during each round of experimental testing. An efficiency change in the thermal efficiency of the boiler corresponding to the initial operating parameters in each round of experimental testing and a parameter change in the test operating parameter corresponding to the initial operating parameters in each round of experimental testing may be sequentially calculated. A ratio of the efficiency change corresponding to the initial operating parameters in each round of experimental testing to the parameter change in the test operating parameter corresponding to the initial operating parameters in each round of experimental testing may be determined as the coefficient of influence of the test operating parameter of the round of experimental testing. A preset count of experiments may be repeated and then stopped. An average or a maximum value of the coefficients of influence of the test operating parameter of multiple rounds of experimental testing may be calculated, and determined as the coefficient of influence of the test operating parameter. The preset adjustment magnitude may be preset, such as 5%. The preset count of experiments may be preset, such as 5 times.

In some embodiments, in the multiple rounds of experimental testing for the same test operating parameter, the control device may adjust a preset adjustment magnitude of the test operation parameter in the next experimental testing based on the coefficient of influence obtained from the previous round of experimental testing. For example, the larger the coefficient of influence obtained in the previous round of experimental testing, the smaller the preset adjustment magnitude of the test operating parameter in the next round of experimental testing. Otherwise, the smaller the coefficient of influence obtained from the previous round of experimental testing, the larger the preset adjustment amplitude of the test operating parameter in the next round of experimental testing.

It is understood that for the test operating parameter with a relatively small coefficient of influence obtained in the previous round of experimental testing, increasing the preset adjustment magnitude of the test operating parameters in the next round of experimental testing may reduce a count of tests required to obtain a reasonable thermal efficiency of the boiler. For the test operating parameter with a relatively large coefficient of influence obtained in the previous round of experimental testing, reducing the preset adjustment amplitude of the test operating parameter in the next round of experimental testing may reduce the count of tests required to obtain the reasonable thermal efficiency of the boiler.

In some embodiments, the control device may determine the test operating parameters and the fixed operating parameters in each round of experimental testing as a set of candidate operating parameters, and obtain the thermal efficiencies of the boiler corresponding to the set of candidate operating parameters. Furthermore, the control device may rank each set of candidate operating parameters based on the thermal efficiencies of the boiler, select top-ranked preset count of candidate operating parameters, and determine the selected plurality sets of candidate operating parameters and the thermal efficiencies of the boiler corresponding to the plurality sets of candidate operating parameters as the set of candidate operating parameters.

In some embodiments of the present disclosure, conducting multiple rounds of testing based on the initial operating parameters may obtain the plurality sets of candidate operating parameters and the thermal efficiencies of the boiler corresponding to the plurality sets of candidate operating parameters. Relatively efficient candidate operating parameters may be quickly determined based on the thermal efficiencies of the boiler. The relatively efficient candidate operating parameters and the thermal efficiencies of the boiler corresponding to relatively efficient candidate operating parameters may be determined as the set of candidate operating parameters, thereby quickly determining more appropriate target operating parameters.

In some embodiments, the control device may perform similarity matching based on current measured sensing data and sensing data corresponding to the set of candidate operating parameters, and select the candidate operating parameters with the highest thermal efficiencies of the boiler from the candidate operating parameters of which similarity is greater than a similarity threshold as the target operating parameters.

In some embodiments, the control device may construct a target vector based on the sensing data, construct a to-be-matched vector based on the sensing data corresponding to the candidate operating parameters, and obtain similarity between the target vector and the to-be-matched vector by calculating a distance between the target vector and the to-be-matched vector. The distance may be negatively correlated with the similarity, i.e., the larger the distance, the smaller the similarity. In some embodiments, the distance may include, but is not limited to, a cosine distance, a Euclidean distance, a Manhattan distance, or the like.

In some embodiments of the present disclosure, determining the target operating parameters from the set of candidate operating parameters based on the sensing data may more quickly and accurately determine the target operating parameters more in line with a practical need, and then control the target device to operate timely according to the target operating parameters in time, thereby avoiding energy waste.

In some embodiments, the control device may select, based on the set of candidate operating parameters, at least one set of candidate operating parameters for which the thermal efficiencies of the boiler satisfy a second preset condition; determine, through a preset manner, total energy consumption corresponding to the at least one set of candidate operating parameters; and determine a set of candidate operating parameters of which the total energy consumption satisfies a third preset condition as the target operating parameters.

In some embodiments, the second preset condition may include that the thermal efficiencies of the boiler are greater than a thermal efficiency threshold. The thermal efficiency threshold may be preset, such as 80%.

It should be understood that the thermal efficiencies of the gas boiler 7 need to reach a certain level to meet the practical need. The thermal efficiency threshold may be set to determine whether the combustion of the gas boiler 7 is qualified.

The total energy consumption refers to a total amount of energy consumed by the system when the operation of the target device is controlled based on the candidate operating parameters. In some embodiments, the total energy consumption may include fuel energy consumption and power energy consumption. The fuel energy consumption refers to an amount of fuel consumed by the system. The power energy consumption refers to an amount of power consumed by the system for denitrogenation combustion and $CO_2$ capture and utilization in the gas boiler.

In some embodiments, the control device may determine the total energy consumption corresponding to at least one set of candidate operating parameters in a preset manner. For example, the preset manner may include determining the amount of natural gas supplied by the natural gas supply device as the fuel energy consumption, and obtaining a power meter reading outside the system and using the power meter reading as the power energy consumption. The power meter outside the system may be configured to record all the power consumed by the system.

In some embodiments, the third preset condition may include that the total energy consumption is minimum.

In some embodiments, the preset manner may include determining the total energy consumption corresponding to the candidate operating parameters through an estimation model based on the set of candidate operating parameters.

The estimation model refers to a model configured to determine the total energy consumption. In some embodiments, the estimation model may include a machine learning model. For example, the estimation model may include any one or any combination of a Convolutional Neural Networks (CNN) model, a Neural Networks (NN) model, or other customized model structure, etc.

In some embodiments, an input of the estimation model may include the candidate operating parameters, and an output of the estimation model may include an estimated thermal efficiency and the total energy consumption. The estimated thermal efficiency refers to an estimated thermal efficiency of the boiler.

In some embodiments, the control device may train the estimation model based on a large number of training samples with labels by, for example, gradient descent. The training samples may include sample candidate operating parameters, and the labels of the training samples may include actual thermal efficiencies of the boiler and total energy consumption. In some embodiments, the training samples may be obtained based on historical data, and the labels may be determined based on manual labeling.

In some embodiments of the present disclosure, by processing a large number of candidate operating parameters through the estimation model, patterns may be found from a large amount of data using the self-learning capability of the machine learning model, and a correlation relationship between the candidate operating parameters and the estimated thermal efficiency and the total energy consumption may be obtained, thereby improving the accuracy and efficiency of determining the estimated thermal efficiency and the total energy consumption.

In addition, the features, structures, or characteristics of one or more embodiments of the present disclosure may be suitably combined.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

By way of example, should there be any inconsistency or conflict between the description, definition, and/or the use of a term associated with any of the incorporated material and that associated with the present document, the description, definition, and/or the use of the term in the present document shall prevail.

What is claimed is:

1. A process for denitrogenation combustion and $CO_2$ capture and utilization in a gas boiler, wherein a system required for the process includes:
   a natural gas supply device configured to supply natural gas;
   a hydrogen production device by water electrolysis configured to prepare hydrogen and oxygen;
   an oxygen preparation device configured to prepare oxygen and nitrogen;
   a nitrogen compressor configured to pressurize and transmit the nitrogen prepared by the oxygen preparation device to a downstream nitrogen utilization device;
   a carbon-based denitrogenation gas mixer configured to prepare carbon-based denitrogenation gas by mixing the oxygen prepared by the hydrogen production device by water electrolysis, the oxygen prepared by the oxygen preparation device, and circulating flue gas transmitted by a blower;
   a gas heat exchanger configured to perform heat exchange between the natural gas supplied by the natural gas supply device, the hydrogen prepared by the hydrogen production device by water electrolysis, the carbon-based denitrogenation gas supplied by the carbon-based denitrogenation gas mixer, and the circulating flue gas to heat the natural gas, the hydrogen, and the carbon-based denitrogenation gas by recovering waste heat of the circulating flue gas;
   the gas boiler;
   a chimney configured to vent the circulating flue gas in the gas boiler under an abnormal operating condition or when an amount of the circulating flue gas is excessive;
   a flue gas dehydration device configured to dehydrate the circulating flue gas after waste heat recovery;
   the blower configured to pressurize and transmit a portion of the circulating flue gas after waste heat recovery and dehydration to the carbon-based denitrogenation gas mixer;
   a $CO_2$ recovery device configured to purify and deoxidize the portion of the circulating flue gas after waste heat recovery and dehydration to prepare a $CO_2$ product; and
   a $CO_2$ compressor configured to pressurize and transmit the $CO_2$ product obtained by the $CO_2$ recovery device to a downstream $CO_2$ utilization device; wherein
   a circulating flue gas outlet is connected with the gas heat exchanger, the gas heat exchanger is connected with the chimney and the flue gas dehydration device, respectively, and the flue gas dehydration device is connected with the blower and the $CO_2$ recovery device, respectively;
   the blower is connected with the carbon-based denitrogenation gas mixer, and a flow regulating valve is disposed on a connection pipeline between the blower and the carbon-based denitrogenation gas mixer;
   an oxygen outlet of the hydrogen production device by water electrolysis and an oxygen outlet of the oxygen preparation device are connected with the carbon-based denitrogenation gas mixer, and a flow regulating valve is disposed on a connection pipeline between the oxygen outlet of the hydrogen production device by water electrolysis and the oxygen outlet of the oxygen preparation device and the carbon-based denitrogenation gas mixer;
   the carbon-based denitrogenation gas mixer is connected with the gas heat exchanger, a flow detector, a temperature detector, a pressure detector, an oxygen purity detector, and a flow regulating valve are disposed on a connection pipeline between the carbon-based denitrogenation gas mixer and the gas heat exchanger, and a carbon-based denitrogenation gas outlet of the gas heat exchanger is connected with the gas boiler;
   a hydrogen outlet of the hydrogen production device by water electrolysis and a natural gas outlet of the natural gas supply device are connected with the gas heat exchanger, and a hydrogen/natural gas outlet of the gas heat exchanger is connected with the gas boiler;
   a $CO_2$ outlet of the $CO_2$ recovery device is connected with the $CO_2$ compressor, the $CO_2$ compressor is connected with the downstream $CO_2$ utilization device, and a water outlet of the flue gas dehydration device is connected with the oxygen preparation device;

a nitrogen outlet of the oxygen preparation device is connected with the nitrogen compressor, and the nitrogen compressor is connected with the downstream nitrogen utilization device; wherein the process comprises:

1) In an initial phase, the gas boiler utilizing air for supporting combustion to produce the circulating flue gas, after the circulating flue gas is produced, gradually replacing the air with the carbon-based denitrogenation gas prepared by the circulating flue gas and the oxygen as a combustion improver, and after a period of circulation, the carbon-based denitrogenation gas completely replacing air for supporting combustion, and carbon-based denitrogenation gas supporting combustion entering into a normal operation state;

2) After the circulating flue gas is discharged from the gas boiler, introducing the circulating flue gas into the gas heat exchanger for heat exchange with the natural gas, the hydrogen prepared by the hydrogen production device by water electrolysis, and the carbon-based denitrogenation gas, and recovering the waste heat of the circulating flue gas;

introducing the circulating flue gas after waste heat recovery into the flue gas dehydration device for dehydration; introducing the portion of the circulating flue gas after waste heat recovery and dehydration into the blower to be pressurized by the blower and to be introduced into the carbon-based denitrogenation gas mixer; introducing the oxygen prepared by the oxygen preparation device and the oxygen prepared by the hydrogen production device by water electrolysis into the carbon-based denitrogenation gas mixer; uniformly mixing the circulating flue gas and the oxygen in the carbon-based denitrogenation gas mixer to obtain the carbon-based denitrogenation gas; introducing the carbon-based denitrogenation gas into the gas heat exchanger to be heated by the waste heat of the circulating flue gas and then fed into the gas boiler as the combustion gas; and introducing the natural gas and the hydrogen prepared by the hydrogen production device by water electrolysis into the gas heat exchanger to be heated by the waste heat of the circulating flue gas and then fed into the gas boiler for supporting combustion; and 3) Introducing a remaining portion of the circulating flue gas after waste heat recovery and dehydration into the $CO_2$ recovery device for purification and deoxygenation to obtain the $CO_2$ product, pressurizing and transmitting the $CO_2$ product to the downstream $CO_2$ utilization device using the $CO_2$ compressor; and pressurizing and transmitting the nitrogen prepared by the oxygen preparation device to the downstream nitrogen utilization device using the nitrogen compressor.

2. The process of claim 1, wherein the carbon-based denitrogenation gas mixer includes an outer cylinder, one end of the outer cylinder is provided with an oxygen inlet pipe and a circulating flue gas inlet pipe, and the other end of the outer cylinder is provided with a carbon-based denitrogenation gas outlet pipe; a gas distribution is disposed at an end of the outer cylinder close to the oxygen inlet pipe and the circulating flue gas inlet pipe, the gas distribution is a circular plate, and the circular plate is uniformly provided with a plurality of small holes; a gas collector is disposed at an end of the outer cylinder close to the carbon-based denitrogenation gas outlet pipe, the gas collector is a hollow frustum cone shape, a large round end of the hollow frustum cone shape is provided with a circular plate, the circular plate is uniformly provided with a plurality of small holes, a small round end of the hollow frustum cone shape is open and communicated with the carbon-based denitrogenation gas outlet pipe; and a plurality of horizontal fins and vertical fins are spaced between the gas distributor and the gas collector within the outer cylinder.

3. The process of claim 2, wherein a material of the carbon-based denitrogenation gas mixer is stainless steel.

4. The process of claim 2, wherein a work process of the carbon-based denitrogenation gas mixer includes:

the oxygen entering the outer cylinder through the oxygen inlet pipe, the circulating flue gas entering the outer cylinder through the circulating flue gas inlet pipe, after the oxygen and the circulating flue gas are preliminarily mixed before entering the gas distributor, the oxygen and the circulating flue passing through the small holes uniformly distributed on the gas distributor, then passing through the spaced horizontal fins and vertical fins to be uniformly mixed, and then passing through the small holes uniformly distributed on the gas collector to be collected into the carbon-based denitrogenation gas outlet pipe and finally discharged from the carbon-based denitrogenation gas mixer.

5. The process of claim 1, wherein the blower is a variable frequency blower.

6. The process of claim 1, wherein the hydrogen production device by water electrolysis and the oxygen preparation device are connected with an external green power device.

7. The process of claim 1, wherein a nitrogen outlet of the oxygen preparation device is also connected with an inlet of the blower.

8. The process of claim 1, wherein an original air combustion fan is connected with the gas heat exchanger.

9. The process of claim 1, wherein in the operation 2), a $CO_2$ concentration of the circulating flue gas after waste heat recovery, dehydration, and circulating enrichment is 95v % or more; a purity of the oxygen prepared by the oxygen preparation device is 99.6v % or more, a pressure of the oxygen prepared by the oxygen preparation device is within a range of 0.05-0.2 MPa without free water, and a purity of by-product nitrogen is 99.9v % or more; a purity of the hydrogen prepared by the hydrogen production device by water electrolysis is 99.9v % or more, and a purity of the oxygen prepared by the hydrogen production device by water electrolysis is 99.2v % or more without free water; and an oxygen concentration of the carbon-based denitrogenation gas is within a range of 18-35v %, and a pressure of the carbon-based denitrogenation gas is within a range of 0.05-0.2 MPa.

10. The process of claim 1, wherein in the operation 2), the carbon-based denitrogenation gas is introduced into the gas heat exchanger to be heated by the waste heat of the circulating flue gas to raise a temperature by 30° C.-50° C. and enter the gas boiler for supporting combustion; and the natural gas and the hydrogen prepared by the hydrogen production device by water electrolysis are introduced into the gas heat exchanger to be heated by the waste heat of the circulating flue gas to raise a temperature by 30° C.-50° C. and enter the gas boiler for the combustion.

* * * * *